United States Patent [19]

D'Angelo et al.

[11] 4,253,892
[45] Mar. 3, 1981

[54] METHOD AND APPARATUS FOR MAKING CUSHIONED SHIPPING BAGS

[75] Inventors: Joseph J. D'Angelo, Wycoff, N.J.; Lawrence S. Maccherone, Crystal Lake, Ill.

[73] Assignee: Flexible Design Packaging Machine Company, Hawthorne, N.J.

[21] Appl. No.: 12,288

[22] Filed: Feb. 15, 1979

[51] Int. Cl.³ ............................................. B32B 31/00
[52] U.S. Cl. ..................................... 156/84; 156/155; 156/290; 156/311; 156/322; 206/523; 229/53
[58] Field of Search ............... 156/84, 290, 292, 155, 156/322, 311; 229/53, 48 T; 206/521, 523, 313

[56] References Cited
U.S. PATENT DOCUMENTS

| | | | |
|---|---|---|---|
| 2,224,370 | 12/1940 | Wescott | 156/322 |
| 2,962,158 | 11/1960 | Strutheus | 229/53 |
| 3,256,527 | 6/1966 | Studen | 206/523 X |
| 3,317,038 | 5/1967 | Bade et al. | 206/313 |
| 3,344,973 | 10/1967 | Studen | 206/523 X |
| 3,768,724 | 10/1973 | Hill | 229/53 |
| 4,011,798 | 3/1977 | Bambara et al. | 206/523 X |

Primary Examiner—David A. Simmons
Attorney, Agent, or Firm—Parmelee, Johnson, Bollinger & Bramblett

[57] ABSTRACT

Method and apparatus are described for making cushioned shipping packet bags. A pocket within the cushioned bag is defined between two resilient, lightweight, flexible cushioning layers of polypropylene microfoam material which advantageously exhibits a relatively "non-slip" frictional gripping action on the item or items contained within the sealed packet bag. The cushioned bag is produced on a continuous motion machine having capability for adjusting the length and width of the cushioned bags produced. Two packages can be simultaneously produced end-to-end when their combined lengths do not exceed the overall width of the machine. To enable the protective outer kraft paper layers of the bag to be sealed together in spite of the intervening polypropylene material, this material is burned away from between the outer layers during the heat sealing of a polyethylene coating on the inner surfaces of the kraft paper enclosure by heat energy conducted through the kraft paper.

6 Claims, 10 Drawing Figures

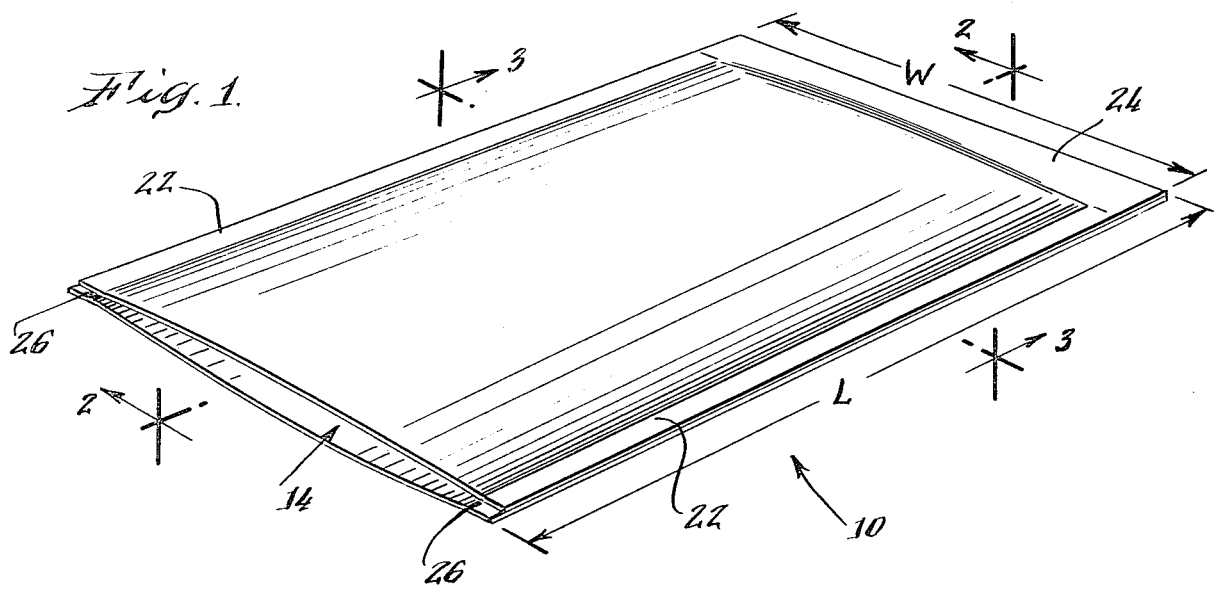
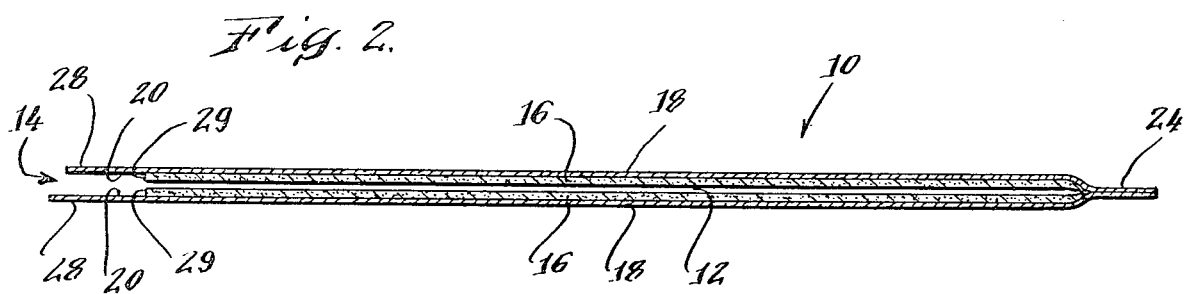
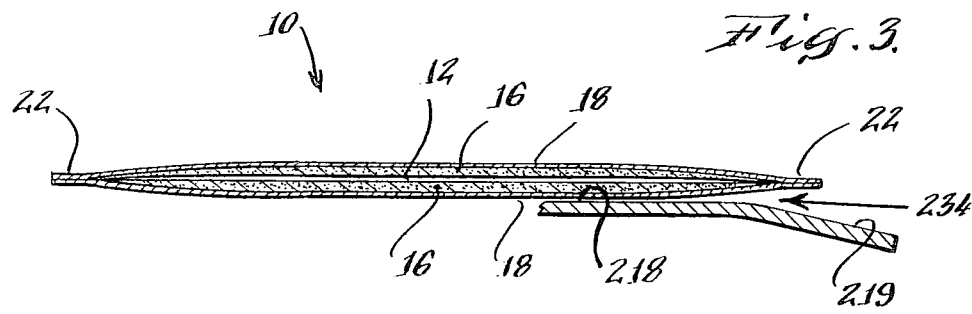

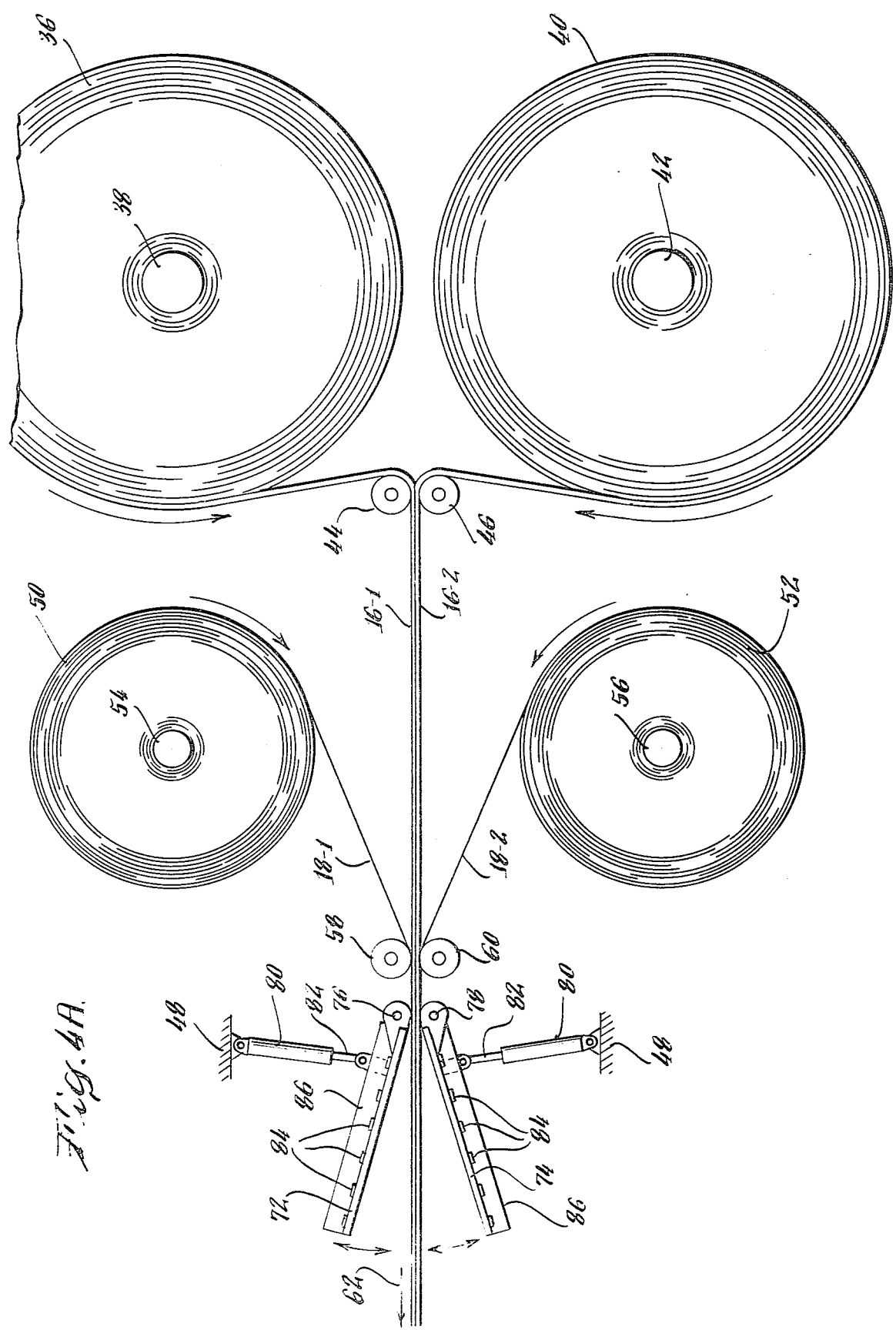

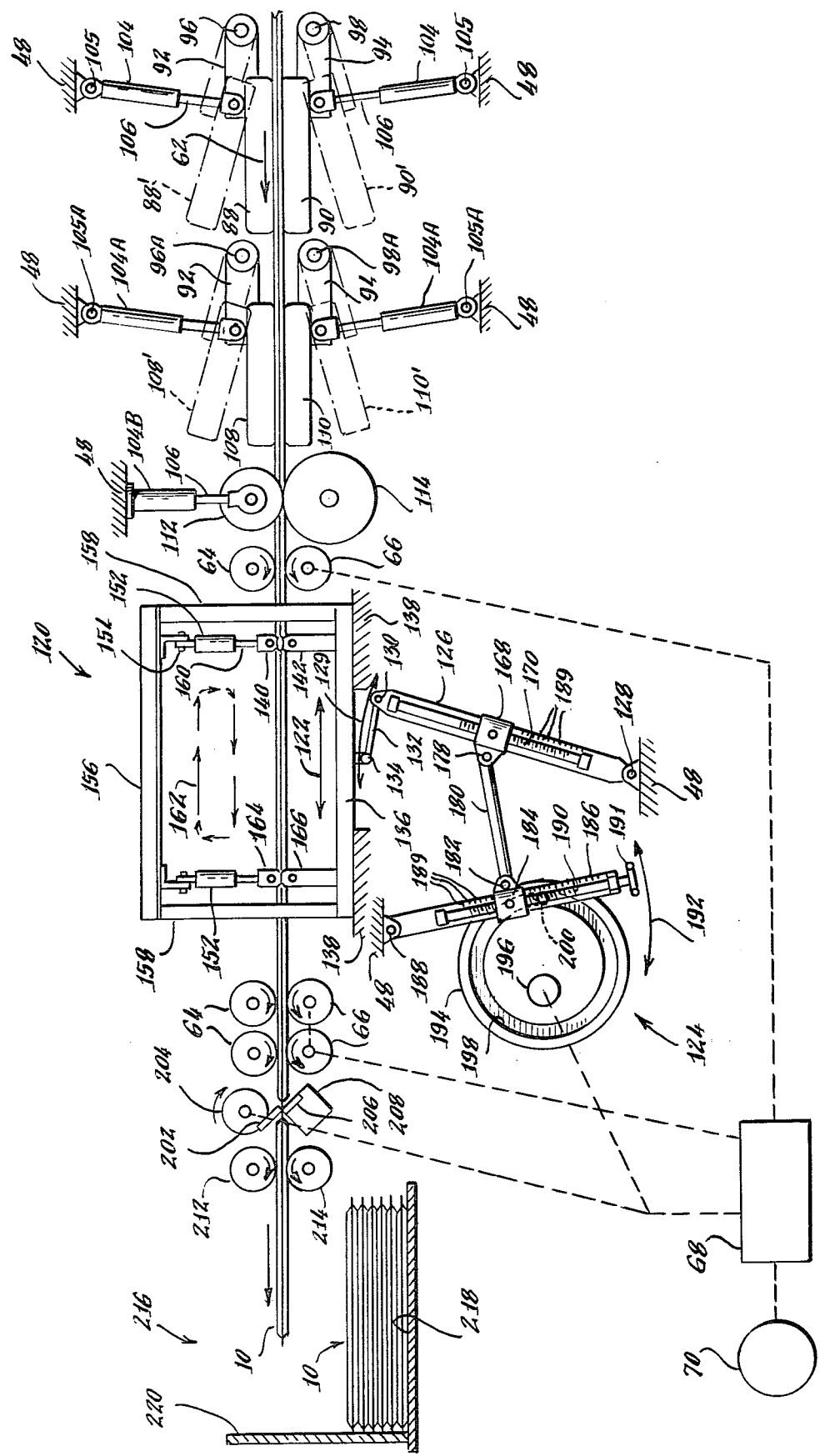

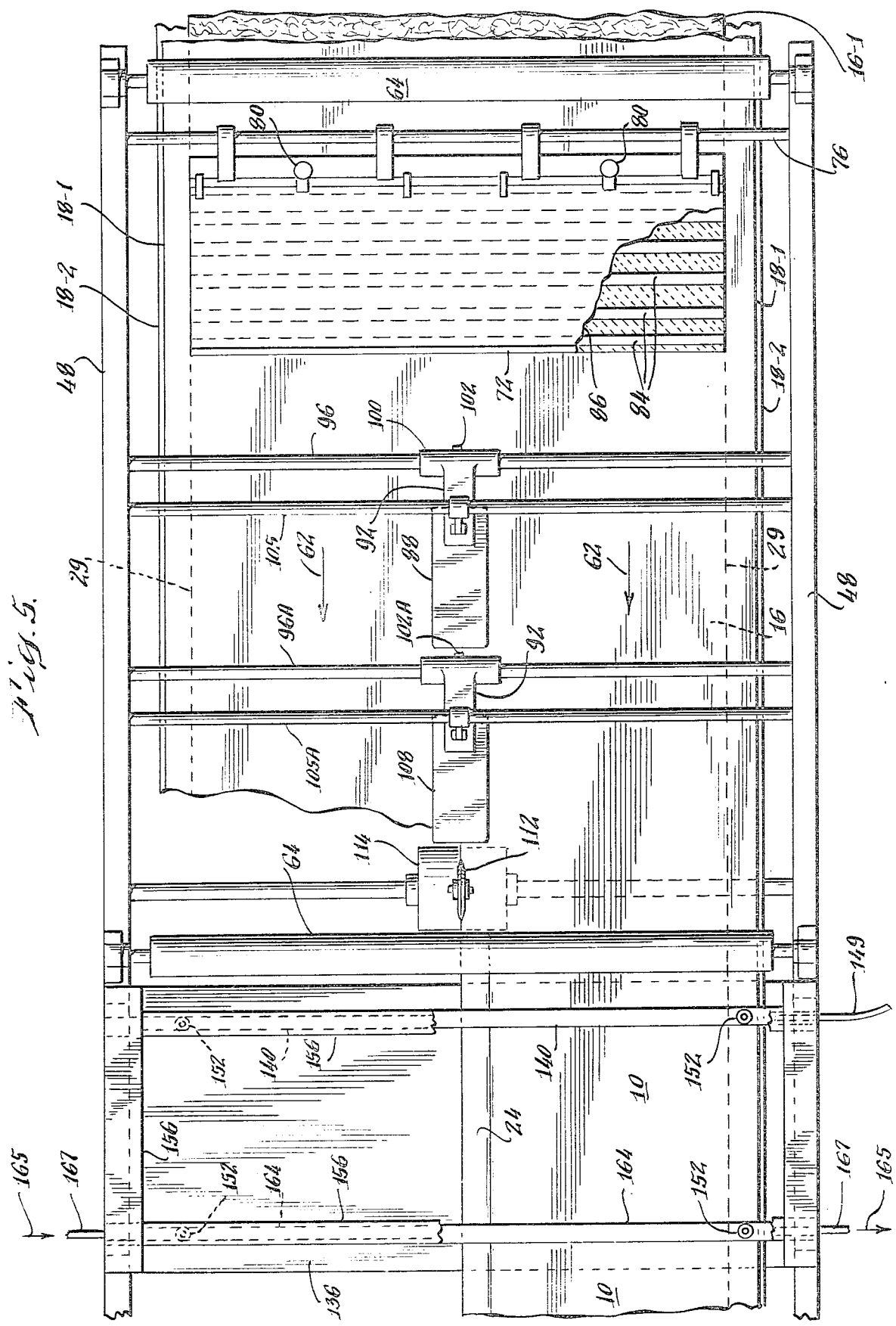

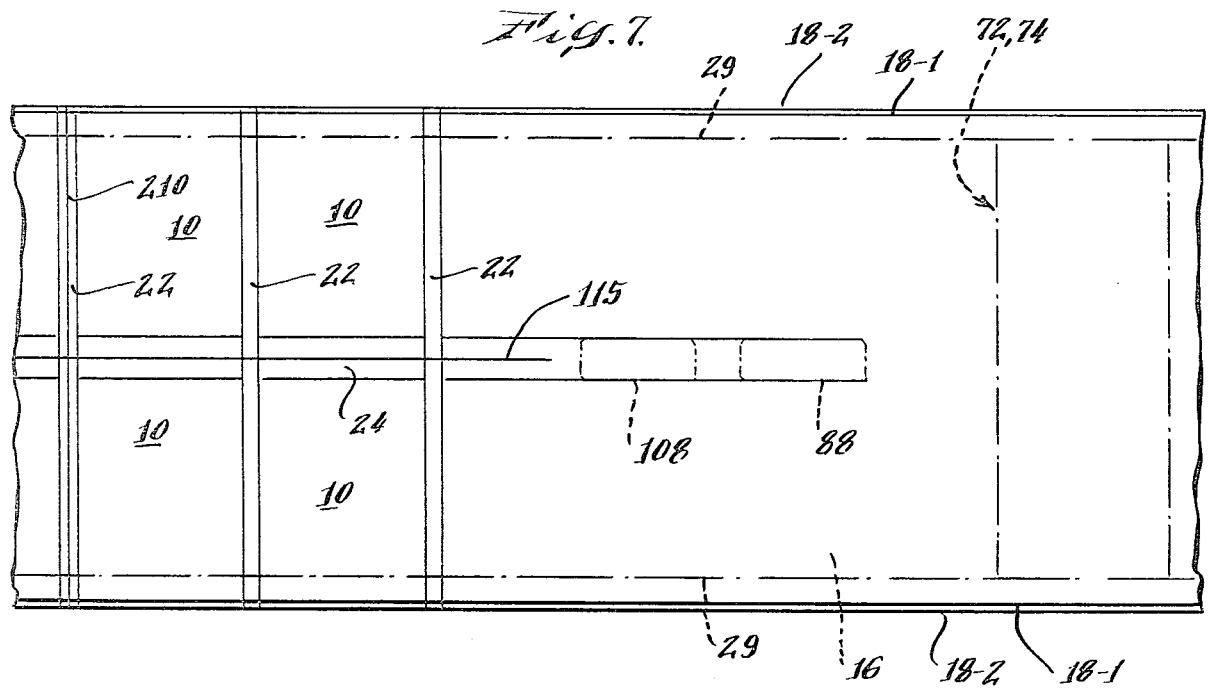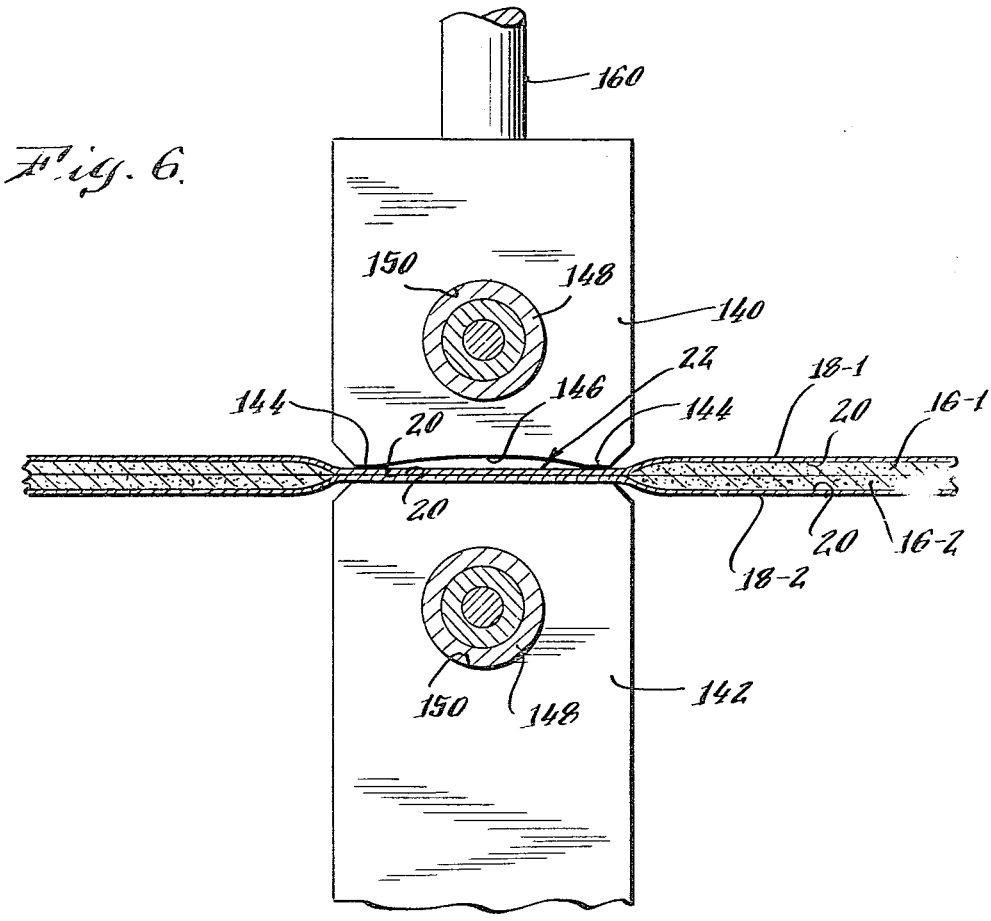

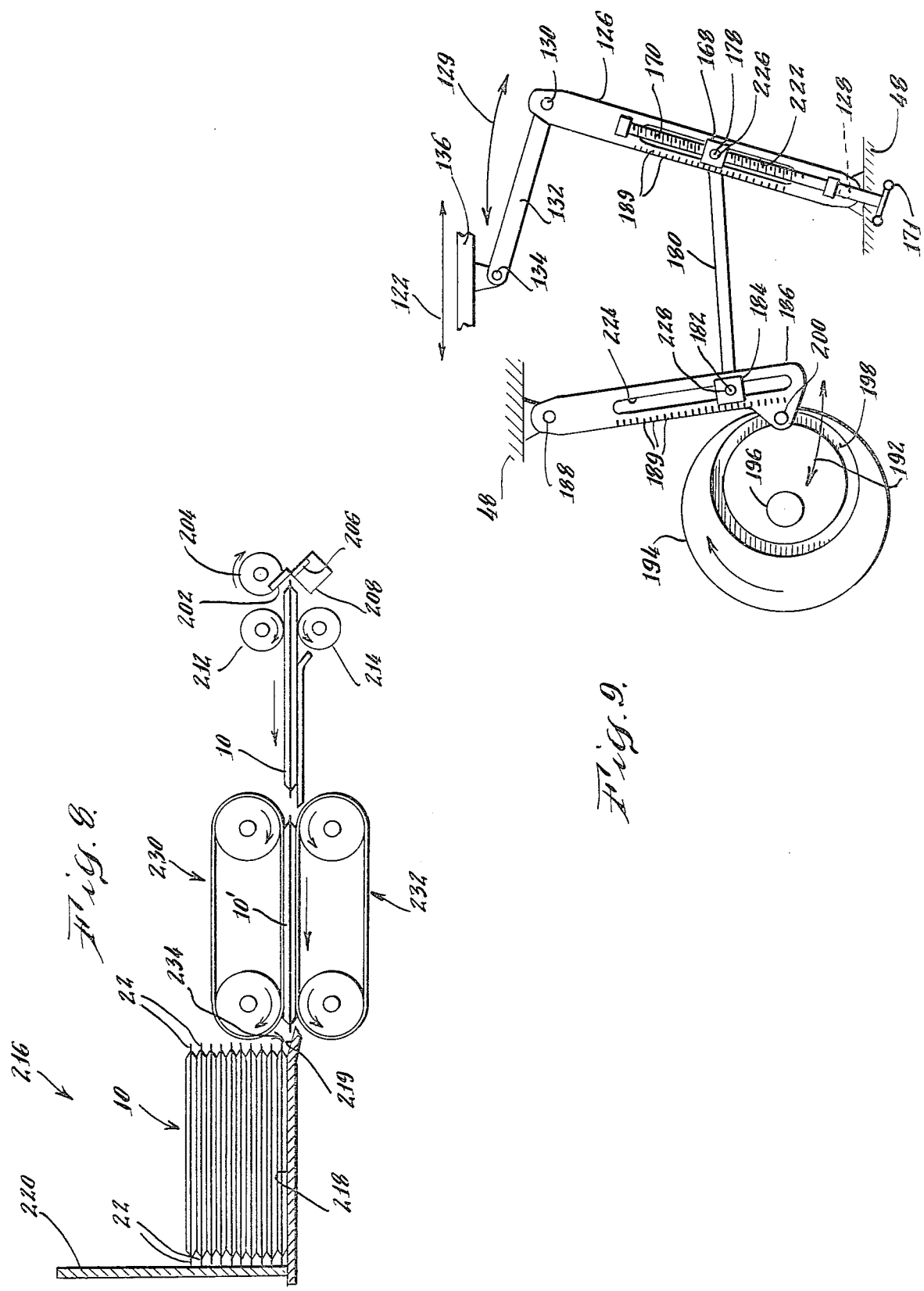

METHOD AND APPARATUS FOR MAKING CUSHIONED SHIPPING BAGS

FIELD OF THE INVENTION

This invention is in the field of cushioned shipping packet bags and method and apparatus for making such bags.

BACKGROUND OF THE PREFERRED EMBODIMENTS

There are cushioned bags commercially available today; however, such prior art packages are relatively bulky and heavy. For example, certain of such prior art cushioned bags are stuffed with shredded paper, or similar shredded or particulate masses of spongy filler material. Their structure is relatively complex, requiring a double-walled bag in order to contain the masses of particulate filler.

There are also cushioned shipping bags lined with microfoamed polyethylene material; however, such material is relatively slippery. It is often referred to in the packaging industry as having a "high slip," thereby allowing the contained item or items to slip and slide around at random within the polyethylene-lined package.

Although microfoamed polypropylene material is less expensive and lighter in weight than microfoamed polyethylene material, it has not previously been employed, insofar as we are aware, as the lining in cushioned shipping bags, because polypropylene microfoam material does not heat seal well with itself. Polypropylene material is sometimes referred to in the packaging industry as having a "low tack" when attempting to heat seal it with itself.

This problem of non-heat-sealability of polypropylene is advantageously overcome by coating the inner surfaces of the outer kraft paper layers with a thin coating of polyethylene. Then the intervening layers of polyproplyene material are burned away from between the kraft paper layers in the immediate heat seal regions and at the same time when the heat seals are being formed, so that these outer paper layers can be directly heat sealed together face-to-face through the interaction of their polyethylene coatings. The heat energy for accomplishing this burn-away and heat sealing action is conducted from heated members through the respective kraft paper layers, and each seal is quickly set by fast-cooling action produced by cold chiller members applied to the exterior of the kraft paper layers in respective regions where the heated members were previously engaged thereon.

In the "burn-away" of the polypropylene microfoam material, this very low density material is quickly heated to a sufficiently high temperature that it melts and rapidly shrinks back upon itself, becoming absent from the region where the seal is being made.

BRIEF DESCRIPTION OF THE DRAWINGS

The foregoing and other objects, features, and advantages of this invention will become more fully understood from the following more particular description of a preferred embodiment of the invention, as illustrated in the accompanying drawings, in which like reference characters refer to the same parts throughout the different views. The drawings are not necessarily to scale, emphasis instead being placed upon illustrating the principles of the invention.

FIG. 1 is a perspective view of a cushioned shipping packet bag produced by apparatus embodying the invention and employing methods of this invention;

FIG. 2 is a longitudinal cross-sectional view of the bag of FIG. 1, being taken along the line 2—2 of FIG. 1;

FIG. 3 is a transverse cross-sectional view thereof taken along the line 3—3 in FIG. 1;

FIGS. 4A and 4B together are a side elevational view of a machine for making cushioned shipping packet bags as shown in FIGS. 1–3. FIG. 4A shows the upstream end of the machine, and it should be placed end-to-end with FIG. 4B at the left which shows the downstream end of this machine;

FIG. 5 is a top plan view of a portion of the machine of FIGS. 4A and 4B;

FIG. 6 is an enlarged side elevational view of the heated sealing bars which form a transverse seal across the moving webs of packaging material, thereby sealing the two-side edges of adjacent bags which are later severed apart along a cut line extending along the center of this transversely heat sealed region;

FIG. 7 is a diagrammatic plan view on reduced scale as compared with FIG. 5. FIG. 7 illustrates the operation of the portion of the machine as shown in FIG. 5 for simultaneously making two bags end-to-end;

FIG. 8 illustrates an advantageous method for stacking the completed bags; and

FIG. 9 shows a presently preferred twin arm adjustable stroke reciprocating drive system.

DETAILED DESCRIPTION

As shown in FIGS. 1, 2 and 3, a cushioned shipping packet bag 10 made using the invention has an interior space 12 in the form of a chamber or pocket with a mouth 14 through which one or more items can be inserted into the chamber 12 in readiness to be shipped. Enclosing this chamber 12 on either side are two resilient, spongy, lightweight, flexible cushioning layers 16 of foamed plastic material, preferably polypropylene microfoam material. The thickness of each cushioning layer 16 in any given bag depends upon the configuration of the items to be shipped and upon the desired amount of cushioning to be afforded to the items by the bag, as will be explained further below. Outside of each cushioning layer 16 is a tough, protective layer 18 of flexible sheet material forming the enclosure which provides strength and durability to the bag as a whole.

In this bag 10, as shown, each outside protective layer 18 is a kraft paper sheet which has been coated on its inner surface with a very thin coating 20 of polyethylene for purposes of heat sealing. This polyethylene coating 20 has been attached by heat-sealing to the microfoam polypropylene layer 16 as will be explained for securing this cushioning layer to the enclosure layer 18.

The bag 10, as shown, has a length L and a width W. Bags of various lengths and widths can be produced by the adjustable continuous motion machine which will be described below. Extending along each side edge of the bag 10 is a heat-sealed side border region 22, and extending along the bottom of the bag is a heat-sealed border region 24. Considering the bag 10 as a whole, it is seen that its perimeter is formed by a heat-sealed border 22, 24, 22 extending around the bag from one corner 26 of the mouth 14 to the other corner 26 of the mouth.

In this border region 22, 24, 22 the two outer layers 18 have their heat-sealable coatings 20 directly heat sealed together. This side and bottom sealing 22 and 24 is accomplished by burning away the polypropylene cushioning 16 from between the layers 18 immediately prior to bonding their polyethylene coatings together by heat energy conducted from the outside through the respective outer layers 18. Immediately as soon as the cushioning material 16 has been burned away from between these heated layers 18 in the side and bottom border seal regions 22 and 24, respectively, these border seal regions are chilled by cold jaws as will be explained below, thereby setting the respective border seals 22 and 24.

The mouth 14 is defined by lips 28 of the respective outer layers which project beyond the nearby edge 29 of the cushioning material 16. For convenience of the user in opening the mouth of the bag, one of these lips 28 may project out slightly beyond the other, as illustrated in FIGS. 1 and 2.

After the item or items to be shipped have been placed in the container space 12, the packet bag 10 is closed by heat sealing the two lips 28 together. The thin heat-sealable coating 20 covers the inner surfaces of these lips as shown in FIG. 2. Other closing techniques may also be used, such as folding the lips 28 over and stapling or sealing with pressure-sensitive tape or adhesive, etc.

Among the advantages of utilizing a foamed polypropylene cushioning material as compared with foamed polyethylene material are those resulting from the fact that polypropylene is less expensive and less dense, thereby providing more yield of material per pound of polyproplyene. Consequently, polypropylene is a more efficient utilization of the natural resources of the earth than polyethylene. Moreover, a layer of microfoam polypropylene material is lighter in weight than a layer of microfoam polyethylene material of equal thickness, thereby conserving shipping costs as well as the energy necessary to transport the packet bag itself from the bag manufacturer to the user shipper, and then from the shipper to the ultimate destination of the shipped time.

A further advantage flowing from the use of polypropylene microfoam cushioning material is the non-slip characteristics exhibited by its surface, thus minimizing any tendency for the item or items to shift back and forth within the sealed confines of the package. In other words, the effective non-slip or frictional grip characteristics of the microfoamed polyproplyene material causes the articles to stay put in the desired position within the sealed bag during shipping.

There are means for supplying two webs 16-1 and 16-2 of microfoam polypropylene material; these two webs continually travel toward the left in FIG. 4A. The supply means includes an upper roll 36 of the microfoam material rotatably mounted on a support shaft 38 and a lower roll 40 of the microfoam material rotatably mounted on a parallel support shaft 42. The respective webs 16-1 and 16-2 are unwound from the rolls 36 and 40 and run past a pair of parallel guide rollers 44 and 46.

It is to be understood that there is a suitable frame 48 (FIG. 5) which serves to support the respective shafts 38 and 42 and the rollers 44 and 46 and the other components of the machine to be described. Such a frame is conveniently fabricated from hollow rectangular steel tubing approximately 2 inches square in cross section and welded together in conventional manner.

The two outer protective layers 18-1 and 18-2 of flexible sheet material are supplied from upper and lower feed rolls 50 and 52 rotatably supported on respective parallel shafts 54 and 56. The two webs of this flexible sheet material 18-1 and 18-2 are payed off from these supply rolls 50 and 52 and travel past a pair of parallel guide rollers 58 and 60 which press these outer layers 18-1 and 18-2 against the outside surfaces of the respective webs 16-1 and 16-2 of the cushioning material.

In this example, the webs 18-1 and 18-2 are heavy kraft paper having a thin coating 20 (FIG. 2) of heat-sealable material, for example polyethylene, on the respective inner surface, such inner surface being defined as the one coming into contact with the outside of the adjacent cushion layer 16-1 or 16-2. During operation of the machine, the four webs 18-1, 18-2 and 16-1 and 16-2 are continuously travelling to the left as indicated by the arrow 62.

In order to move these adjacent layers of web, there are pairs of draw rolls 64 and 66 rotated by drive mechanism 68 which, in turn, is driven by an electrical motor 70. This drive mechanism 68 includes interchangeable gearing for establishing the rate of web travel 62. As will be explained further below, the width of the packet bags can be adjusted. When wider bags 10 are being made, the gearing in the drive mechanism 68 is changed to produce a corresponding increased web speed 62, and vice versa when narrower bags are being made.

In order to cause the protective outer layers of kraft paper 18-1 and 18-2 to adhere to the cushioning layers 16-1 and 16-2, there are a pair of heater plates 72 and 74 having smooth working surfaces facing toward the travelling webs and being formed of metal of good heat conductivity, for example of aluminum. These heater plates 72 and 74 are hinged at pivots 76 and 78, respectively, and they can be pressed firmly against the travelling webs by means of pneumatic cylinder and piston assemblies 80 having their respective piston rods 82 pivotally connected to brackets on the heater plates, with the cylinders being pivotally mounted to the frame 48. When the machine is operating, the heater plates 72 and 74 are firmly pressed against the travelling kraft paper webs 18-1 and 18-2. Whenever the operation of the machine is stopped for any reason, the piston rods 82 are retracted for swinging these heater plates away from contact with the kraft webs in the withdrawn position, as shown in FIG. 4A, for preventing scorching of the web material.

The heater plates 72 and 74 are a relatively large area plates, and they are maintained at a temperature of approximately 600° F. by a plurality of parallel electrical strip heaters 84 extending transversely across the width of the respective heater plates. These strip heaters 84 are electrically insulated from the heater plates on which they are mounted. Overlying these strip heaters 84 is a thermal insulation blanket 86 of relatively high temperature insulation material, for example of asbestos. The heat from these heater plates 72 and 74 is conducted through the webs 18-1 and 18-2 and softens their heat sealable inner surface coatings of polyethylene approximately to the melting temperature, thereby producing a bond to the respective adjacent polypropylene cushion layer 16-1 and 16-2.

The overall width of the machine, as shown in FIG. 5, is 20 inches, and the packet bags being produced, as shown in FIGS. 1 through 3, have a length L of approximately 10 inches, and a width W of approximately 6 inches. Thus, two of the packet bags 10 are simultaneously made in aligned end-to-end position with the bottom border 24 of one being contiguous with the bottom border 24 of the other. In order simultaneously to form the bottom perimeter seal 24 on both of the aligned bags, there are a pair of heater shoes 88 and 90 carried by brackets 92 and 94 which are mounted on spaced parallel rotatable shafts 96 and 98. These brackets have sleeve portions 100 (FIG. 5) which surround the respective shafts 96 and 98 and are secured in position thereon by means of set screws 102.

When the machine is operating, the respective heater shoes 88 and 90 are firmly pressed against the travelling kraft paper webs 18-1 and 18-2 by means of the cylinder and piston assemblies 104. The piston rods 106 of these assemblies are pivotally connected to the respective movable brackets 92 and 94. When the operation of the machine is stopped for any reason, the piston rods 106 are retracted for swinging these heater shoes 88 and 90 into their retracted positions 88' and 90' for preventing scorching of the web material. The cylinders 104 are pivotally mounted to support shafts 105 extending transversely on the machine frame 48.

It is also possible to have the lower heater shoe 90 stationary, so that only the upper one 88 is retracted when the operation of the machine is stopped. It is our preferred mode to retract only the upper shoe, because the machine is thereby somewhat simplified.

These heater shoes 88 and 90 are each heated by an electrical cartridge heater inserted into a socket within the respective shoe, and the shoe itself is made of metal of good heat conductivity, for example of aluminum. Heater shoes 88 and 90 have a width in the range from approximately 5/8ths of an inch to $1\frac{1}{4}$ of an inch, as may be desired, for producing the adjacent bottom border seals 24 on the aligned bags. A heater shoe width of approximately one inch is suitable for making a wide range of sizes of cushion bags. These heater shoes have a temperature in the range from approximately 320° F. to approximately 480° F. depending upon the travelling speed 62 of the webs. As the web speed is increased, the heater temperature is increased within this range, and vica versa, because the effective length of time that the heater shoes engage any given region of the web decreases with faster surface speed.

In order to set the seals of the heated border region 24, there are a pair of cold shoes 108 and 110 located immediately downstream from and aligned with the respective hot shoes 88 and 90. These cold shoes have mounting brackets 92 and 94 on respective shafts 96A and 98A similar to those described for the hot shoes. These cold shoes are swung toward each other and held in operating position against the travelling webs 18-1 and 18-2 by cylinder and piston assemblies 104A similar to those described for the hot shoes. The cold shoes are secured in position on their respective shafts 96A and 98A by means of set screws 102A (FIG. 5).

The cold shoes 108 and 110 may be slightly shorter in upstream-downstream length than are the hot shoes 88 and 90. They are chilled by a flow of shop water through cooling passages therein. The cooling water is supplied to these passages through flexible hoses as will be understood. Thus, the heat-sealed region 24 is set by the cold shoes, which have the same width as the hot shoes. Both cold shoes have flat working surfaces in contact with the travelling webs, and the preferred mode is to retract only the upper cold shoe 108.

In order to separate the sealed bottom borders 24 of the two aligned bags, there is cutting wheel 112 cooperating with an anvil roller 114. This cutting wheel 112 is a hardened steel disk having a slightly blunt cutting edge which severs the web material by its relatively concentrated pressure against the anvil roll 114. A pneumatic cylinder and piston assembly 104B having a piston rod 106 urges the cutting wheel 112 against the roll 114, thereby making a cut 115 (FIG. 7).

When it is desired to form bags having a length L greater than one-half of the width of the machine, then the cylinder 104B is actuated to retract its piston rod 106 for withdrawing the cutter wheel 112 away from the travelling webs. The respective hot and cold shoes 88, 90, 108 and 110 can be positioned at any desired transverse position in the machine for forming the bottom border seal 24 by loosening the set screws 102 and 102A and relocating them and their actuating mechanisms 104 and 104A along the respective shafts 96, 98, 105 and 96A, 98A and 105A.

In order to form the side edge seals 22, which extend transversely relatively to the travelling web in the machine, there is a reciprocating carriage 120 which is continuously reciprocated back and forth, as indicated by the arrow 122 in the upstream-downstream direction by means of an adjustable stroke drive mechanism 124. This adjustable reciprocating stroke mechanism includes a first lever arm 126 pivotally mounted at 128 to the frame 48. The upper end of this arm swings back and forth as indicated by a curved arrow 129, and is pivotally connected at 130 to a connecting rod 132, which is pivotally connected at 134 to a lower chassis member 136 of the reciprocatable carriage 120. This chassis member 136 slides back and forth on stationary slide ways 138 mounted on the frame 48.

Mounted on this carriage are a pair of heat sealing bars 140 and 142 (see also FIG. 6) which extend transversely with respect to the travelling webs. The upper heater bar 140 as shown has a pair of parallel lands 144 (FIG. 6) with an intervening somewhat concave surface 146 extending transversely with respect to the travelling webs. The spaced parallel lands 144 define the edges of the heat sealed region 22, and the slight concavity 146 relieves pressure on the webs, thereby facilitating rapid shrink back of the polypropylene material during its burn away. There is an electrical cartridge heater 148 having a flexible electrical supply cable 149 (FIG. 5). Such a cartridge 148 is inserted into a socket 150 extending longitudinally within each heater bar 140 and 142. These heater bars 140 and 142 are formed of aluminum and have a width of approximately one inch.

The configuration of the working surfaces of the upper and lower heater shoes 88 and 90 may correspond, respectively, with the configuration of the heater bars 140 and 142 as shown enlarged in FIG. 6.

As the reciprocating carriage 120 is moving downstream at a velocity which is synchronized with the velocity of the travelling web, the heater bars 140 and 142 are clamped firmly against the opposite sides of the web, as shown in FIG. 6. They serve to burn away the intervening layers 16-1 and 16-2 of polypropylene material, and to soften the polyethylene coating 20 on the inner surfaces of the outside layers 18-1 and 18-2.

A pair of pneumatic cylinder and piston assembles 152 (see also FIG. 5) has the cylinder mounted at 154 to an upper chassis member 156 which is held by columns 158 on the lower chassis member 136.

After the intervening layers of the cushioning material 16-1 and 16-2 have been burned away and the heat-sealable coating 20 has been heated approximately to its melting temperature, the upper heater bar 140 is withdrawn by retraction of the piston rods 160, thereby elevating the heater bar 140 away from contact with the web. This heater bar remains in its elevated position during the return (upstream) stroke of the carriage 120. The temperature of the heater bars is adjusted to be sufficient to burn away the cushioning layers and to heat the sealable coating 20 to its sealing temperature. In this machine, the heater bar 140 is down in engagement with the moving web for a "dwell time" which endures for approximately one-half of the downstream stroke length 122.

In summary, the overall motion of the heater bar 140 is indicated by the rounded rectangular path indicated by the arrows 162. In order to set the heated area 22 (FIG. 6) produced by the heater bars 140 and 142, there are a pair of cold bars 164 and 166 extending transversely with respect to the travelling webs. The upstream-downstream stroke 122 of the carriage 120 is arranged such that the cold bars 164 and 166 close against the travelling web during the downstream stroke of the carriage. These cold bars 164 and 166 have flat working surfaces, and are the same width as the heater bars 140, 142, and engage exactly on the same location 22 as was a brief moment previously engaged and heated by the heater bars 140 and 142. As shown in FIG. 5, these cold bars 164 and 166 are chilled by a flow of shop water 165 fed through flexible hose lines 167 and passing through cooling passages in the cold bars which are made of metal of good heat conductivity, for example aluminum.

Thus, the seals 22 are set by the clamping force and chilling action of the cold bars 164 and 166. The cold bar 164 may be raised and lowered by two cylinder and piston assemblies 152 identical with those as described for the heater bar 140 and having the same dwell time.

An alternative arrangement for raising and lowering the heater bar 140 and cold bar 164 is to connect them directly to the top carriage member 156. Then, this carriage member may be raised and lowered by cylinder and piston assemblies interconnected between the lower chassis member 136 and the upper chassis member 156. In that case, the columns 158 comprise the vertical guide rods for guiding the up-and-down movement of the top chassis member 156.

For adjusting the stroke length 122 of the movable carriage 120, there is a movable yoke 168 which is slidable along the first swinging arm 126. A lead screw 170 extending parallel with and mounted on the arm 126 is used to adjust the relative position of the yoke 168 along the length of this arm. This yoke 168 is pivotally connected at 178 to a link 180 whose opposite end is pivotally connected at 182 to another similar yoke 184 mounted upon a second swingable arm 186. This second swingable arm 186 is pivotally attached at 188 to the frame 48. A lead screw 190 extending parallel with and mounted upon its arm 186 is used to adjust the relative position of the bracket 184 along the arm 186. The swinging arms 126 and 186 have calibrated index marks 189 threon for aiding the user in setting the desired positions of the adjustable yokes 168 and 184 for providing the desired length of stroke 122 of the carriage 120.

In this machine, the carriage stroke length 122 can be adjusted from 3 inches up to 18 inches.

For swinging the arm 186 back and forth about its pivot 188, as indicated by the curved arrow 192, there is a face cam 194 which is driven by a rotatable shaft 196. This face cam has an eccentric cam channel 198 in which is captured a cam follower 200 mounted on the swingable arm 186. Thus, as the cam 194 is rotated, the arm 186 is swung back and forth by the cam follower 200 which tracks the eccentric motion of the cam channel 198.

When it is desired to increase the length of the carriage stroke 122, the two yokes 168 and 184 are adjusted downwardly along their respective arms 126 and 186 thereby increasing the motion multiplication effect of these two interconnected levers, because the yoke 184 is closer to the free end of the driving lever 186, while the driven yoke 168 is closer to the anchored pivot 128 (fulcrum) of the driven arm 126.

Conversely, when it is desired to decrease the relative stroke length of the carriage 120, the two yokes 168 and 184 are adjusted upwardly in position along their respective arms 126 and 186, thereby moving the driving yoke 184 further away from the free end of the driving arm 186 while simultaneously moving the driven yoke 168 further away from the fulcrum 128 of the driven arm 126.

There is a cut-off knife 202 mounted on a rotating roll 204 and cooperating in shearing action with an anvil knife 206 mounted on a fixed frame member 208. The knife blade 202 is rotated to operate in registered synchronism with the respective positions of the side seals 22, so that the bags are severed one from the other along a cut line 210 (FIG. 7) which is located approximately in the center of each sealed region 22. This registration of the cut 210 with the side seal 22 is accomplished as shown in FIG. 4B by rotating the cutter roll 204 in synchronism with rotation of the cam shaft 196.

A pair of out-feed rollers 212 and 214 feed the completed bags into a stacking area 216. This stacking area is shown as including a supporting table 218 with a fence or stop plate 220. Thus, a neatly aligned stack of completed packet bags 10 is accumulated in the region 216.

To make one of the lips 28 (FIG. 2) at the mouth of the packet bag 10 protrude beyond the other, one of the webs 18-1 and 18-2 (usually the upper one) is somewhat narrower than the other, as illustrated in FIG. 7.

There are two pairs of draw rolls 64 and 66 downstream from the side seal forming carriage 120 in order to assure good traction on the web in spite of the presence of the spaced parallel side seals 22 which cause periodic changes in the effective overall thickness of the web material being drawn by these rolls. Also, these two pairs of downstream draw rolls are driven at a slightly faster peripheral speed, for example in the range from 2% to 5% faster, than the upstream pair of draw rolls 64, 66 in order to keep the intervening web material reasonably taut for producing good operating characteristics of the reciprocating, transverse-seal making carriage 120.

In FIG. 4B, the lead screws 170 and 190 each may contain a short hexagonal section to facilitate adjustment by a wrench. Alternatively, there may be a hand knob 191 on the end of the lead screw for convenience in rotating the lead screw about its own axis for making the yoke position adjustment.

As an alternative to the yoke arrangement as shown in FIG. 4B, the arms 126 and 186 may be constructed as shown in FIG. 9 with longitudinal slots 222 and 224, respectively. Then, the yokes 126 and 186 are slidable along in these respective slots and can be clamped in place by clamping bolts 226 and 228, respectively. A lead screw as shown at 170 may be used to adjust the position of such a clampable yoke having a hand knob 171 for adjustment. Alternatively, the lead screw can be omitted as shown for the lever 186 in FIG. 9, and the clampable yoke is then adjusted in position along its slot 224 by hand. The availability of such a lead screw is desirable convenience in enabling precise adjustment of the carriage stroke length 122. The presently preferred mode for constructing these levers is with a longitudinal slot 222 and 224, as shown in FIG. 9.

A novel and convenient stacking method for the completed cushion bags 10 is shown in FIG. 8, in which each bag being discharged from the machine is fed into the stacking area 216 by insertion at the bottom of the stack. The table 218 has a short front ledge 219 which slopes upward in the downstream direction to form a ramp. There are a pair of belt-type conveyors 230 and 232 which engage each discharged bag 10' between them and insert this discharge bag 10' into position between the table 218 and the bottom-most bag in the stack. The fin-like edge seal 22 (FIG. 3) is relatively thin as compared with the main body of the bag 10. Thus, as illustrated at 234 in FIG. 3, there is a generally wedge-shaped space between the edge seal 22 and the table 218 with its ramp 219, and the completed bag is advantageously propelled into this space 234 by the conveyors 230 and 232.

The conveyors 230 and 232 each includes a plurality of relatively narrow bands, for example of polyurethane elastic, revolving in parallel with each other for forming the conveyor belts, thereby providing a strong frictional grip on the discharged bag 10' for inserting it below the stack.

Among the advantages of building the stack from the bottom are that the stack of bags can be taken away by hand from the top at any time without interference of conflict with the bags 10' being discharged from the machine.

The machine is adapted to run at a speed of approximately 60 cycles per minute, i.e. sixty rotations of the shaft 196 per minute, thereby providing approximately 120 bags per minute when they are being made two abreast as shown in FIG. 7, but it can be speeded up if desired.

The cushion layers 16 may each have a thickness in the range from 1/32 of an inch up to ¼ of an inch or even more. The polypropylene microfoam material is currently being produced in thickness up to 3/32 of an inch. Therefore, to obtain thicknesses of the cushion layer 16 above this value of 3/32", multiple plies of the polypropylene microfoam material may be laid together to form a thicker layer as is known to the fabricator of such microfoam material.

It is to be noted that the polypropylene microfoam material 16 melts at a lower temperature than the heat-sealable coating 20 which, in turn, melts at a lower temperature than that which will injure the kraft paper protective outer layer 18. If in the future a tough, flexible sheet material is developed having durable properties similar to kraft paper 18, and which is injured by heat only at a higher temperature than the heat-sealable coating 20, then such sheet material would be usable in this method and apparatus for making the cushion bags 10.

As an alternative to making a bag with a heat-sealed bottom margin 24 (FIG. 1), the bottom of the bag may be folded over. The fabrication of such a folded bottom bag is accomplished by using relatively wide webs 16-1 and 18-1, and by omitting the webs 16-8 and 18-2. Then the cushion layer 16-1 is folded over longitudinally against itself, and the outer layers 18-1 is folded over at the same time for forming the folded bottom region of the bag. In this event, the heated shoes 88, 90 and the cold shoes 138, 110 and associated components may be omitted.

It is to be noted that the adjustable-stroke reciprocating drive mechanism 124 can be used in other types of bag making machines, namely, wherever a reciprocating carriage is desired to be driven with an adjustable stroke length, and is desired to be moving in synchronism with a travelling web during a substantial portion of its downstream stroke, for example such as to have a synchronized travel amounting approximately to one-half of the downstream carriage stroke.

We claim:

1. A method of making a cushion packet bag comprising the steps of:

providing two outer protective layers of tough, durable, flexible sheet material;

providing a heat-sealable coating on a pre-determined surface of each of said outer layers;

said heat-sealable coating having a melting temperature below the temperature at which said outer layers become damaged;

positioning said outer layers with their coated surfaces facing inwardly toward each other;

sandwiching two layers of polypropylene microfoam cushioning material between the coated inner surfaces of said outer layers;

said polypropylene microfoam material melting at a temperature below said coating;

heat-sealing the perimeter of the bag by applying heat and pressure to predetermined regions of the exterior surfaces of the outer protective layers for feeding heat energy inwardly through said layers for burning away and rapidly shrinking back the intervening polypropylene layers for exposing said coated surfaces directly to each other and for causing the softened exposed coatings on the two outer protective layers to directly engage each other for heat sealing said outer layers directly together in face-to-face relationship;

immediately thereafter applying cold chiller members to said exterior surfaces of said outer protective layers in said predetermined regions for chilling said heat sealed regions of the outer protective layers for setting the perimeter seal; and severing successive bags from each other by a cut line positioned in said sealed perimeter region.

2. A method of making a cushion packet bag as claimed in claim 1, which:

said outer protective layers are tough kraft paper, and
said heat-sealable coating is a coating of polyethylene having a higher melting temperature than the temperature at which said polypropylene microfoam material is caused to become burned away by melting and shrinking back upon itself.

3. A method of making a cushion packet bag as claimed in claim 1 or 2, including the step of:

prior to heat sealing the perimeter of the bag, feeding heat energy inwardly through said two outer layers over the entire area to be formed into the bag for preheating and softening the coatings on the inner surfaces of said outer layers.

4. A method of making a cushion packet bag as claimed in claim 3, in which:

said pre-heating is accomplished by heating a pair of plates of metal of good heat conductivity to a temperature of approximately 600° F.; and continuously moving the four layers together in web from between said heated plates.

5. A method of making a cushioned shipping bag comprising the steps of:

providing two outer protective layers of tough, durable, flexible sheet material;

providing a heat-sealable coating on a predetermined surface of each of said outer layers;

said heat-sealable coating having a melting temperature below the temperature at which said outer layers become damaged;

positioning said outer layers with their coated surfaces facing inwardly toward each other;

sandwiching two layers of polypropylene microfoam cushioning material between the coatings on the inner surfaces of said outer layers;

said polypropylene microfoam material melting at a temperature below the temperature at which said coating melts;

heat-sealing a region of the bag by applying heat and pressure to the exterior surfaces of said outer layers in said region for feeding heat energy inwardly through said outer layers for burning away and rapidly shrinking back the intervening polypropylene layers and for softening the coatings in said region and for bringing said softened coatings directly together face-to-face in said region for heat sealing said outer layers together in said region;

said heat and pressure being applied to the exterior surfaces of said outer layers in said region in a manner for facilitating the rapid shrink back of the polypropylene material from between the coatings during its burn away in said region; and immediately thereafter applying pressure and chilling to the exterior surfaces of said outer layers in said same region thereof for setting said heat seal.

6. The method of making a cushioned shipping bag as claimed in claim 5, including the steps of:

prior to heat sealing said region of the bag, feeding heat energy inwardly through said two outer layers over an area larger than said heat-sealed region for preheating the outer layers and for causing said coatings to adhere to the polypropylene cushioning material.

* * * * *